United States Patent [19]
Oilund et al.

[11] Patent Number: 5,096,270
[45] Date of Patent: Mar. 17, 1992

[54] GUIDING GUARD FOR CRAWLER TRACKS

[76] Inventors: Lester D. Oilund, 9862 Prairie Road, Grande Prairie, Alberta, Canada, T8V 3R9; David S. Fenton, Grovedale General Delivery, Grovedale, Alberta, Canada, T0H 1X0

[21] Appl. No.: 558,475

[22] Filed: Jul. 27, 1990

[51] Int. Cl.⁵ ............................... B62D 55/088
[52] U.S. Cl. ...................... 305/12; 305/27; 305/16; 180/6.7; 180/8.7; 180/9.1
[58] Field of Search ............. 305/12, 16, 17, 18, 305/21, 24, 27, 28, 60; 180/6.7, 8.7, 9.1

[56] References Cited

U.S. PATENT DOCUMENTS

| | | | |
|---|---|---|---|
| 1,003,025 | 9/1911 | Baker | 305/17 |
| 1,571,628 | 2/1926 | Hendrickson | 305/12 X |
| 2,022,079 | 11/1935 | Eberhard | 305/12 |
| 2,049,693 | 8/1936 | Eberhard | 305/9 |
| 2,418,610 | 4/1947 | Webb | 305/12 X |
| 4,006,940 | 2/1977 | Halterman, Jr. | 305/12 |
| 4,097,093 | 6/1978 | Shelby et al. | 305/27 X |
| 4,229,053 | 10/1980 | Cline | 305/12 X |
| 4,265,494 | 5/1981 | Matsubara et al. | 305/12 |
| 4,763,961 | 8/1988 | Parrott | 305/12 |

FOREIGN PATENT DOCUMENTS

| | | | |
|---|---|---|---|
| 524126 | 4/1956 | Canada | 305/17 |
| 963359 | 7/1950 | France | 305/18 |
| 542717 | 1/1942 | United Kingdom | 305/18 |

*Primary Examiner*—Russell D. Stormer
*Attorney, Agent, or Firm*—Bull, Housser & Tupper

[57] ABSTRACT

A guiding guard assembly for a crawler track vehicle is relatively easy to install initially as a "retrofit kit", and can also be easily removed and replaced as needed. Furthermore, the guiding guard does not obstruct idler bearings of the lower run of the track, thus permitting easy servicing. A plurality of transverse supports are secured to the vehicle and disposed transversely of each crawler track and spaced longitudinally apart. Structure for locating a guiding guard member on each side of each crawler track relative to the transverse supports is provided so that a lower face of each guiding guard member is spaced closely to a lower run of each crawler track to resist excessive twisting of the track. Support portions secured to the transverse supports and guard portions secured to the guiding guard members having inclined locating surfaces which cooperate with each other to prevent relative movement between the guiding guard member and the supports when secured together.

32 Claims, 4 Drawing Sheets

GUIDING GUARD FOR CRAWLER TRACKS

BACKGROUND OF THE INVENTION

The invention relates to track guiding guard members used with crawler track vehicles, particularly in rough terrain, such as encountered in road building and logging in mountainous and forested areas.

Crawler track vehicles have a pair of spaced apart endless loops of links, the links being pinned together by link pins for relative articulation between adjacent links. Relatively large area track pads are secured to each link to distribute load of the vehicle onto the ground. It is well known that relative twisting or rotation about a longitudinal axis can occur between lower runs of the crawler track and idlers engaging such runs for transferring weight of the vehicle to the runs. Particularly on rough terrain when the vehicle is traversing rocks, tree stumps, etc., complete weight of the vehicle can sometimes be supported on only three or four track pads of the tracks. If the pads bear the weight off-centre, high asymmetrical loads are applied to the pads which can twist sufficiently to shear the pins connecting the associated links together, and/or the pads themselves can fracture. If the lower run of the track is under relatively low tension, with severe twisting, the lower run can disengage from the idlers, and then from the drive sprocket, that is, the vehicle can "throw a track". It is also well known that crawler track vehicles are prone to damage from material becoming jammed between the track engaging idlers and upper faces of lower runs of the crawler tracks. This can become a problem when the vehicle is operating in relatively deep loose rocks or other loose material. The problems identified above have been solved in the main by some prior art guiding guards, but the guards themselves present problems for servicing.

Guiding guard members have been developed which enclose a lower run of the track to support the lower run against twisting and to reduce chances of material falling onto lower runs of the crawler track. One type of guiding guard member or track roller guard is shown in U.S. Pat. No. 2,049,693 issued to the Caterpillar Tractor Co. and used extensively in North America. While the guard serves the intended purpose, it has some disadvantages which can increase cost of operation of the vehicle. For example, the guard is secured to the vehicle by a plurality of vertically disposed nuts and bolts which connect a longitudinal horizontal flange of the guard to a complementary flange of the vehicle. Each guard comprises an essentially continuous heavy vertical plate extending along each side of each crawler track, each plate having a reinforced cut-away portion to provide access for greasing bearings of the idlers. Thus, if the idlers or bearings thereof require maintenance other than routine grease application, usually the guiding guard member must first be removed, which involves removing the plurality of vertically disposed nuts and bolts. Due to the severe operating conditions of many crawler track vehicles, the removal of such nuts and bolts can be highly time consuming and thus routine maintenance of idlers can be costly.

Early examples of the guiding guard members were prone to deflection when subjected to severe interference from the tracks due to terrain obstructions, and thus guards on opposite sides of the track are commonly secured together with transversely disposed bolts which interconnected portions of the guards on opposite sides of each track. Such bolts were also subjected to abuse during use, and increase the time and cost for removal of the track guards.

Commonly, lower portions of the guiding guard members are closely spaced from pins securing links of the lower crawler track run. The small clearance assists in maintaining accurate tracking of the lower run, as well as reducing tendency of material to fall onto the lower run of the track. Examples of the crawler track vehicles with relatively close fitting guiding guard members are shown in U.S. Pat. Nos. 4,006,940 issued to General Motors Corporation of Detroit, Mich. and 4,265,494 issued to Kubota, Ltd. of Japan.

To the inventor's knowledge there are no guiding guard members which permit easy access for servicing bearings of idlers, and permit easy installation and removal of the guards while concurrently being adequately strong to resist lateral deflection when interference occurs between the crawler track and the guiding guard.

SUMMARY OF THE INVENTION

The invention reduces the difficulties and disadvantages of the prior art by providing a guiding guard member assembly which can be quickly removed and replaced from the vehicle body, and is easily initially fitted as a "retro-kit" assembly to an existing vehicle. Furthermore, the guiding guard members do not obstruct bearings of the idlers, thus permitting servicing of the idlers without removal of the guiding guard member. The guiding guard members of the invention are securely and ruggedly attached to the vehicle and are sufficiently strong to resist deflection resulting from severe interference with the crawler tracks, and obstructions encountered during operation of the vehicle.

A guiding guard member assembly according to the invention comprises a plurality of transverse support means, at least one guiding guard member, and a plurality of locating means. The transverse support means are securable to the vehicle to be disposed transversely of each crawler track and to be spaced longitudinally along each crawler track. The guiding guard member is securable longitudinally on each side of each crawler track. The locating means are for locating the guiding guard member relative to the transverse support means so that a lower face of each guiding guard member is spaced sufficiently closely to a lower run of each crawler track to resist excessive twisting of the track. The locating means comprise support portions secured to the transverse supports and guard portions secured to the guiding guard member. The support portions and the guard portions have locating surfaces which cooperate with each other to prevent relative movement between the guiding guard member and the support means when secured together.

Preferably, the locating surfaces of the guard portions and the support portions are inclined at complementary angles and have longitudinal axes extending transversely of the crawler tracks. Also, preferably each transverse support has a lower surface and each guiding guard member has an upper surface. The locating surfaces of the locating means cooperate to urge the said upper and lower surfaces into engagement with each other.

A detailed disclosure following, related to drawings, describes a preferred embodiment of the invention

DETAILED DISCLOSURE

Figure 1:
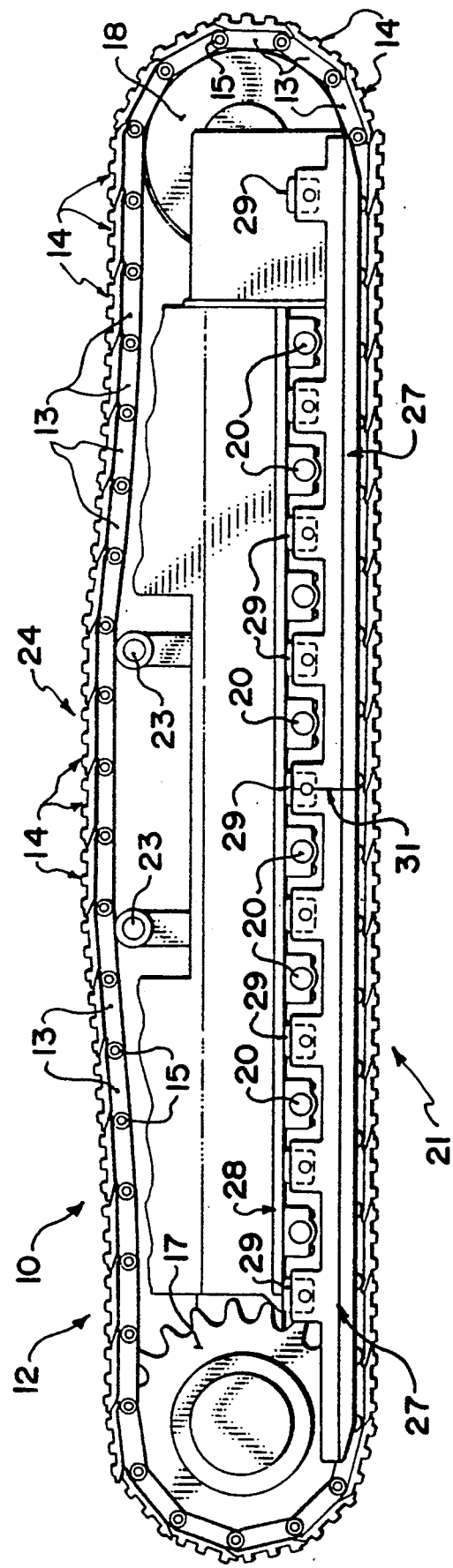
FIG. 1 is a simplified fragmented side elevation of one crawler track assembly fitted with a guiding guard assembly according to the invention, portions of the vehicle body being removed for clarity.
Figure 2:
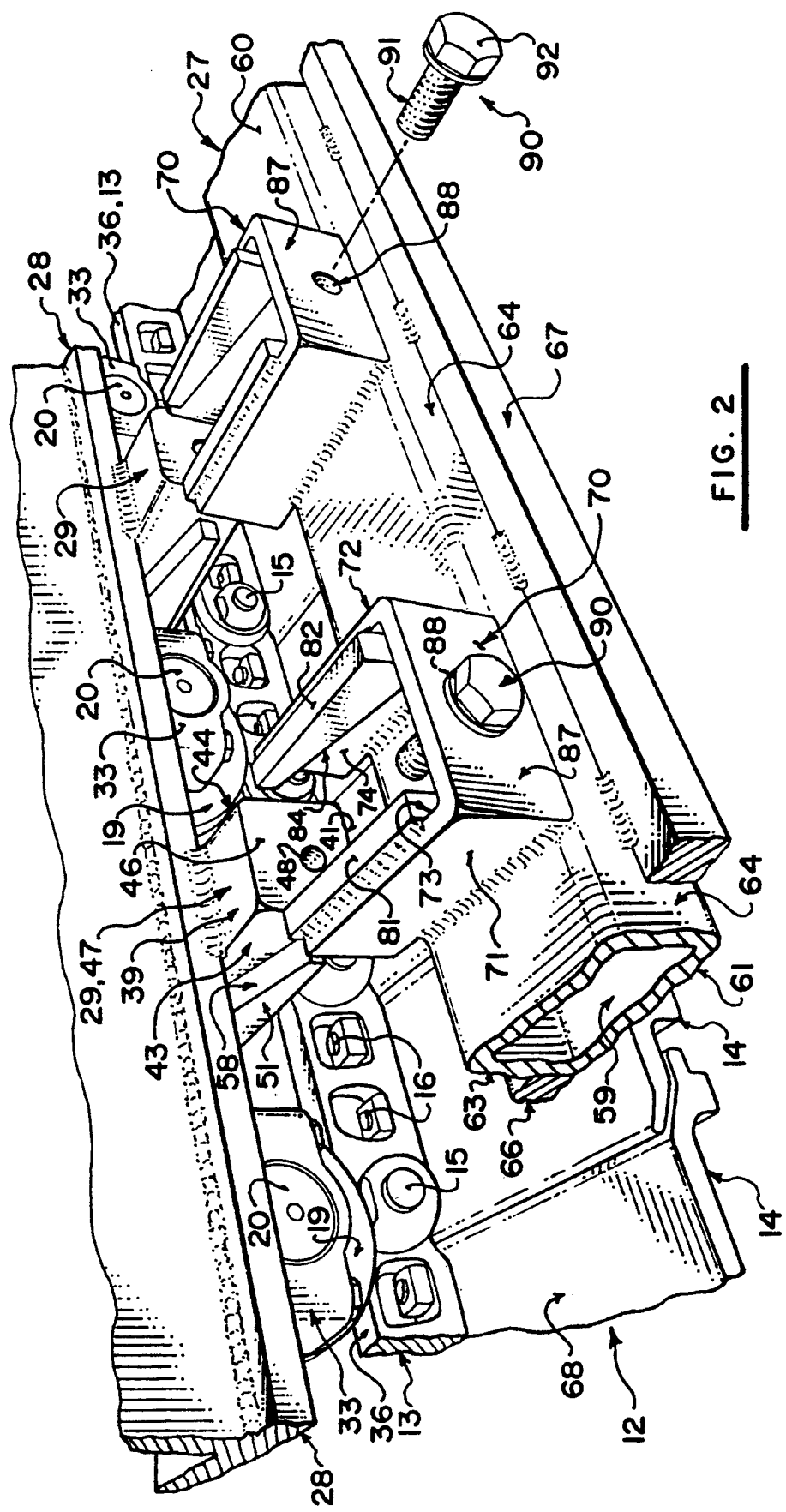
FIG. 2 is a simplified fragmented perspective of a portion of a guiding guard member shown separated from a complementary portion of the guiding guard member support and vehicle body.

FIGS. 1 and 2

An industrial vehicle, not shown, has a pair of prior art crawler tracks laterally spaced apart on opposite sides of the vehicle body and passing around a front pair of main rollers and a rear pair of powered sprockets, one track only being described as follows. A prior art crawler track assembly 10 has an endless loop of crawler track 12 which comprises a plurality of link members 13 interconnected with a plurality of transversely disposed pins 15. Each link member has an associated track pad 14 bolted thereto with bolts 16, not shown in FIG. 1. A powered sprocket 17 and a free-wheeling main roller 18 are mounted at opposite ends of the vehicle and entrain the loop of crawler track 12 therearound as is well known. A plurality of lower idler rollers 19, not shown in FIG. 1, are longitudinally spaced along a lower run 21 of the crawler track and support weight of the vehicle thereon. The idler rollers 19 are carried on aligned bearings 20. A pair of upper idlers 23 support an upper run 24 of the crawler track. The lower run 21 is commonly referred to as a "rail" and the links and pads are usually made from a tough steel which are subjected to much abuse and heavy wear.

A track guiding guard member 27 according to the invention extends between the sprocket 17 and the roller 18 and is spaced closely from the lower run 21 of the crawler track. The guiding guard member is secured to a longitudinally extending body member 28 of the vehicle spaced above the lower run by a plurality of transverse support means 29 according to the invention. The supports 29 are secured to the vehicle body member 28 and disposed transversely of each crawler track and are spaced along each crawler track. In the example shown, nine transverse support means 29 are shown, the supports being spaced apart and alternating between lower idler rollers 19 and the respective bearings 20, so that the supports and idlers alternate along the lower run 21 of the crawler track. For convenience of handling etc, the track guiding guard member 27 is preferably made from two generally similar and separate first and second pieces which extend from a guard mid-position 31 forwardly and rearwardly towards the roller 18 and the sprocket 17 respectively. Each guard member for each side is in two pieces for convenience of handling and replacement, but for a small vehicle a guiding guard member could be made in one piece.

Figure 3:
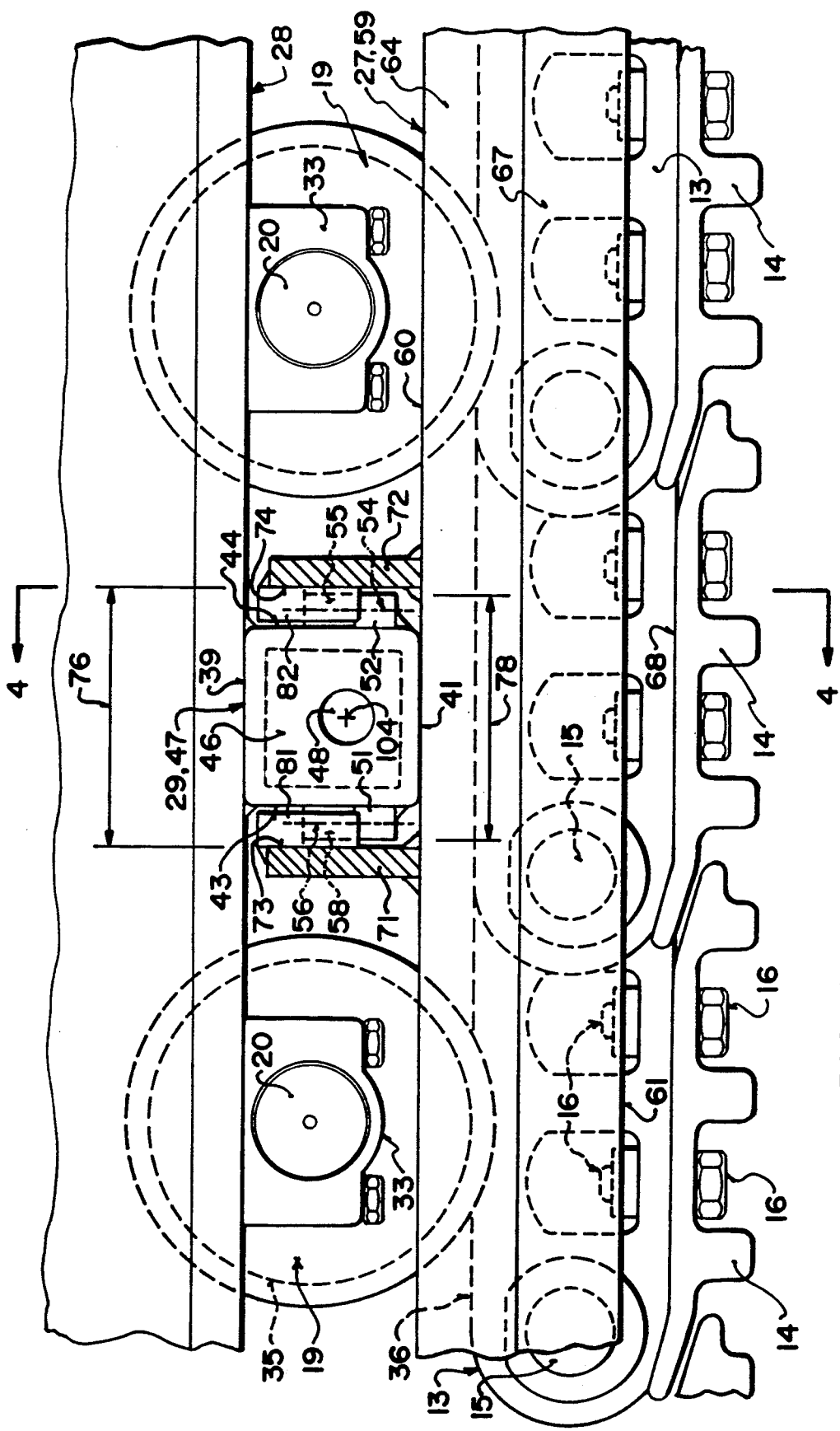
FIG. 3 is a simplified fragmented side elevation of portions of a guiding guard member shown cooperating with complementary locating means according to the invention.
Figure 4:
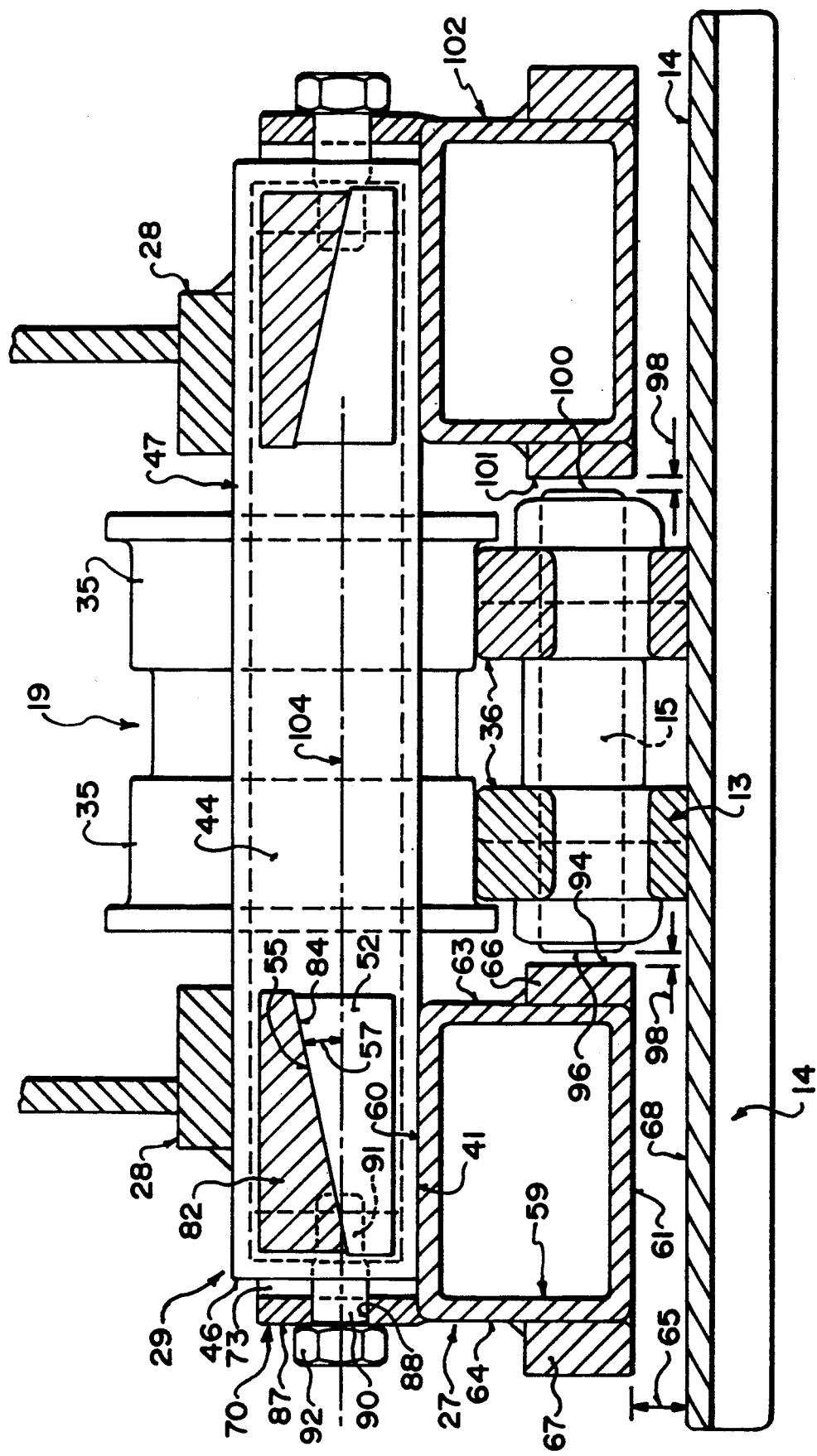
FIG. 4 is a simplified fragmented section generally on Line 4—4 of FIG. 3.

FIGS. 2 through 4

Referring to FIG. 2, the lower idler roller bearings 20 are carried in bearing blocks 33 secured to and extending downwardly from the body member 28. Each bearing 20 carries a respective lower idler roller 19 which has laterally spaced apart flanged bearing portions 35 which engage side bars 36 of the link members 13 of the lower run of the track to support weight of the vehicle thereon.

The transverse support means 29 are generally similar, and thus one transverse support only will be described. The support 29 is generally rectangular in cross-section and has generally horizontal support upper and lower surfaces 39 and 41 respectively, and generally vertical first and second support side surfaces 43 and 44 respectively. The transverse support means is preferably fabricated from a square-sectioned tube 47, which has each opposite end closed by an end plate 46 provided with a threaded opening 48 as will be described.

A first support wedge 51 is secured to the first support side surface 43, and a similar second support wedge 52 is secured to the second support side surface 44. As seen in FIG. 4, the wedge 52 has a locating surface 55 (termed second locating surface for consistency) which is inclined at an angle 57 to the horizontal, e.g. axis 104, and extends upwardly and inwardly towards the vehicle. The first support wedge 51 has a similar first locating surface 58 (FIG. 2) which is inclined at a similar angle so that the first and second locating surfaces 58 and 52 are within an inclined plane inclined upwardly and inwardly towards the vehicle. It can be seen that the locating surfaces 55 and 58 have longitudinal axes 54 and 56 respectively, (FIG. 3 only) extending transversely of the crawler tracks.

Referring to FIGS. 2 and 4, the track guiding guard member 27 comprises a generally rectangular sectioned tube 59 having upper and the lower surfaces 60 and 61 interconnected by vertical inner and outer side surfaces 63 and 64. The lower surface 61 is spaced at a spacing 65 from an upper surface 68 of a pad 14 on the lower run 21, the space 65 being approximately 2 to 4 centimeters. The spacing 65 is sufficiently small to restrict twisting of the lower run 21 of the track relative to the idlers. In other words, any relative rotation about a longitudinal axis of the lower run 21 with respect to the track reduces the spacing 65 until interference occurs between the surface 68 and the surface 61. This would represent the limit of relative twisting. The spacing 65 is also sufficiently small to prevent ingress of large rocks or other debris onto the lower run of the track. Inner and outer reinforcing bars 66 and 67 extend longitudinally along the track guiding guard member 27 adjacent lower portions of the outer and inner side surfaces 64 and 63 respectively. The bar 66 provides additional wearing material to extend life of the guard member 27 and also increases width of the guard member 27 to extend support for the track pad 14 outwardly. This is of particular advantage when the vehicle negotiates rough terrain, and total weight of the vehicle is transferred to a few rocks, tree stumps, etc. which could otherwise break the pads of the track. The inner bar 66 serves another purpose as will be described.

The guiding guard member 27 has a plurality of guiding guard member bracket means 70 secured to the upper surface 60 thereof. One bracket means 70 is provided for each transverse support means 29 and cooperates with the support means to provide a secure mounting for the guiding guard, and yet permitting easy removal thereof when required. The bracket means 70 are essentially identical to each other and thus only one will be described. The bracket means 70 has first and second vertical, plate-like bracket side members 71 and 72 having first and second guard bracket inner side surfaces 73 and 74 respectively. As seen in FIG. 3, the guard bracket side surfaces 73 and 74 are spaced apart at a spacing 76 which is slightly wider than overall width 78 of the locating surfaces of the support side surfaces, namely space between outer surfaces of the wedges 51 and 52 respectively. Thus, the bracket means 70 can straddle the wedges 51 and 52 mounted on the respective tube 47 of the transverse support means 29. A first guard wedge 81 is secured to the first side surface 73 and a second guard wedge 82 is secured to the second guard bracket side surface 74. The wedges 81 and 82 are generally similar to the wedges 51 and 52. As seen in FIG. 2, the second wedge 82 has a locating surface 84, (designated second locating surface for consistency) which is inclined at an angle complementary to the angle 57 of the wedge 52, as seen in FIG. 4. The first guide wedge 81 has a similar first locating surface, not shown, within the same plane. It can be seen that the guard bracket side surfaces have respective locating surfaces of the guard portions located adjacent the respective guard side surface. The locating surfaces of the wedges 81 and 82 have longitudinal axes extending transversely of the crawler tracks, similarly to the axes 54 and 56.

As best seen in FIG. 2, the bracket 70 has a bracket end portion 87 having an opening 88 (not shown clearly) which is alignable with the opening 48 in the end face 46 of the adjacent transverse support means. The opening 88 is a clearance opening for a bolt 90 having a threaded shank 91 which passes therethrough and engages threads within the opening 48 of the support means 29. The bolt 90 has a head 92 which is drawn tightly against the end portion 87 of the bracket so as to transfer force from the bolt through the end portion 87 and onto the first and second wedges 81 and 82.

Referring to FIG. 4, inwards movement of the wedge 82 along the locating surface 55 of the wedge 52 tends to produce an upwards force on the guiding guard member 27. This upwards force is resisted by the lower surface 41 of the transverse support means 29 which is forced against the upper surface 60 of the guard member 27. Thus, an axially applied inwards force by the bolt 90 results in a gradually increasing interference between the locating surfaces 55 and 84 of the second wedges (and similar interference between the first wedges, not shown in FIG. 4), and the support means lower surface 41 and the guard upper surface 60. Assuming all angles are within tolerance, a rigid connection between the support means 29 and the guard member 27 results.

Referring to FIG. 4, the crawler track 12 is shown in cross-section and fitted with a guiding guard member 27 according to the invention on each side thereof. The two similar longitudinal members 28 on one side of the vehicle body are secured to the transverse support means 29, for example by welding. Thus, the support means 29 extends completely across the track on one side of the body and serves to stiffen each body member 28 and to secure each guiding guard member thereto, on both the inside and outside portions of the track. Thus, opposite ends of each transverse support means has complementary pairs of oppositely facing support wedges, and ends of each transverse support means are closed by end plates each with threaded opening to receive a respective bolt therein.

Thus, in summary, each crawler track has a pair of guiding guard members on opposite sides thereof, the guiding guard members being similarly secured to transverse support means, in which opposite ends of each transverse support means supports an adjacent portion of a guiding guard member. Clearly, if each side of each crawler track has generally similar forward and aft guiding guard member, each crawler track would have four guiding guards, and thus a vehicle would have eight guiding guard members altogether. Outer ends of the aligned guiding guard members on each side of the vehicle would be modified in accordance with each vehicle's requirements, and thus forward and aft guiding guard members would not necessarily be interchangeable for opposite side of the track.

As seen in FIG. 4, an inwardly facing face 94 of the inner reinforcing bar 66 is spaced from an outwardly facing end face 96 of the pin 15 by a clearance spacing 98. The spacing 98 is typically between 2 and 5 millimeters and represents clearance between the extreme dimension of the crawler track, and the inner faces of the guiding guard members. A similar clearance spacing 98 is provided between an end face 100 at an opposite end of the pin 15, and a corresponding inwardly facing face 101 of an inner guiding guard member 102 in an opposite side of the track. It is seen that the endless loop of links 13 of the crawler track is limited to lateral movement determined by the spacing 98 on opposite sides thereof, thus ensuring accurate tracking of the link members along the idlers and reducing chances of the tracks derailing from the idlers from the sprockets or from the idlers. Thus the bar 66 reinforces the surface 63 of the member 27 against wear from the end face of the pins 15. Clearly additional bars can be added to the lower surface 61 to decrease the spacing 65, or to the bar 66 to decrease the spacing 98.

OPERATION

Most conventional track laying vehicles can be easily modified to receive the guiding guard member assemblies of the invention which can be supplied as a "retrofit" kit. Initially, the plurality of transverse support means must be fabricated by cutting square sectioned tubes accurately to length, and then welding to opposite ends of the tubes 47 the support wedges 51 and 52 and end plates 46 as best seen in FIG. 4. Clearly, suitable jigs are required to ensure that the wedges are accurately positioned with respect to the lower surface 41 of the support, and also with respect to end faces of the tubes 47 which are closed by the end plates 46. The plurality of support means 29 are then secured to the lower edges of the body members 28 enclosed by each crawler track, as best seen in FIG. 4. This requires accurate positioning and location of the tubes to ensure accurate location of the complementary support wedge surfaces. Clearly the location of the wedge surfaces 55 and 58 determines the clearances between both the upper surfaces of the lower run of the crawler track, and end faces of the pins. Suitable jigs are required to ensure accurate location of the support means relative to the vehicle.

The locating means for the guiding guard member 27 are initially fabricated by first securing the guide wedges 81 and 82 to inner faces of the respective bracket means 70, which can be easily performed in a simple welding jig. Using suitable spacers, the guiding guard member 27, with a clear upper surface 60, is then positioned so that the surfaces 60 and 41 are in contact and the surface 61 is spaced at the spacing 65 above the upper surface 68 of the pads 14 of the lower run. Also, the guard member is positioned so that the inner reinforcing bar 66 is approximately between 4 and 8 millimeters from the end faces 96 of the pins 15. In other words, in the initial installation, the spacing 98 is about twice its final or desired size. The brackets 70, complete with wedges 81 and 82 secured thereto, are then positioned on the ends of the support means 29 with the complementary locating surfaces in intimate engagement with each other, for example, the surfaces 55 and 84. In this position, the bracket means 70 are then carefully welded to the upper surface 60 of the guiding guard member. The bolts 90 can then be fitted through the aligned openings 88 and 48 of the brackets and end faces, and tightened. Clearly, there will be some resulting slight inwards movement due to the force applied by the bolt 90, which should reduce the spacing 98 to be within the desired tolerance as stated above of between 2 and 4 millimeters. Clearly, this method of fabrication is but one example of attaining a relatively accurate location to ensure reasonably close control of the spacing 65 and the spacing 98.

It is noted that the bolts 90 sustain relatively high tensile forces to draw the complementary locating surfaces e.g. 55, 84, of the support wedges and guide wedges together. However, should the guiding guard members be subjected to upwards forces, the bolts are relatively protected from high shear forces due to the engagement between the wedge surfaces and the upper and lower surfaces 60 and 41 of the guiding guard member and support members respectively.

Clearly, once the transverse support means 29 have been secured to the body members 28, and the bracket means 70 have been secured to the upper surface 60 of the guiding guard member 27, it is relatively easy to remove and replace the guiding guard member as required. As the bolts 90 are not subjected to high shear forces under load, the bolts can usually be unscrewed without much difficulty. As indicated earlier, the bearings 20 and bearing blocks 33 are located between adjacent transverse support means, and upper surface 60 of the guiding guard member is spaced below the bearing block 33, thus permitting easy access to the idler bearings 20 for servicing without removal of the guiding guard member.

It can be seen that the support wedges 51 and 52 of the support means 29, and the guard wedges 81 and 82 of the guiding guard member bracket 70 serve as locating means for locating the guiding guard member relative to the transverse support. The location is such that the lower face 61 of each guiding guard member is spaced sufficiently closely to the lower run 21 of each crawler track to resist excessive twisting of the track and to restrain material from falling onto the lower run. The locating means are seen to comprise support portions, namely the support wedges 51 and 52 secured to the transverse supports, and guard portions, namely the guard wedges 81 and 82, secured to the guiding guard members. The support portions and the guard portions having locating surfaces e.g. 55, 58, 84, etc. which cooperate with each other to draw the surfaces 41 and 60 into engagement with each other to prevent relative movement between the guiding guard member and the support means when secured together.

It can be seen that the end face of the transverse support has a first securing means, namely the threaded opening 48 having a horizontal securing means axis 104 disposed transversely of the crawler track. The bracket end portion 87 of the guiding guard member 27 has an opening 88 which serves as a second securing means with an axis alignable with the securing means axis. The bolt 90 serves as a third securing means cooperating with the first and second securing means so that as the third securing means, namely the bolt 90, is tightened, the cooperating locating surfaces of the locating means cooperate to locate the guiding guard member relative to the crawler track, and to prevent relative movement between the guiding guard member and the transverse supports. It can be seen that the first securing means, the threaded opening 48, the second securing means, the opening 88, and the third securing means, the bolt 90, serve as guard securing means for securing the guiding guard member to the end portions of the support means in a position determined by the locating means. It can be seen that the guard securing means on one side of the track is independent of the guard securing means on the opposite side of the track so as to permit a guiding guard member on one side of the track to be readily installed or removed from the support means independently of the guard member on the opposite side of the track.

ALTERNATIVES

The invention is disclosed showing two guiding guard members for each side of each crawler track. Clearly, a single one-piece guiding guard member securable longitudinally on each side of the track could be substituted, or three or more for each side of the track could similarly be substituted.

Clearly, other arrangements of the locating surfaces 55, 58 and 84, etc. can be provided and would function similarly, provided the cooperating locating surfaces of the guard portions and the support portions are inclined at suitable angles to cause interference between the guiding guard member and the support means. Each transverse support means 29 is shown to have a locating surface, e.g. 55 and 58 on each side surface thereof, at each end thereof. Thus, each transverse support has four locating surfaces. While this is a preferred arrangement, with suitable design, one support surface could be eliminated from each end of the support means so that each end of the transverse support means would have at least one support side surface which would be disposed within a plane generally normal to the crawler track. Similarly, if each end of a transverse support were provided with a single locating surface, the corresponding locating means for the guiding guard member would similarly have a single locating surface located adjacent the side guard surface which is disposed within a plane generally normal to the crawler track.

We claim:

1. A guiding guard member assembly for a crawler track vehicle comprising:
    (a) a plurality of transverse support means, each support means having opposite end portions and being securable to the vehicle to be disposed transversely of each crawler track, and spaced longitudinally along each crawler track,
    (b) at least one guiding guard member having a lower face for restricting twisting movement of the track and an inwardly facing face for restricting excessive transverse movement of the track, (c) locating means for locating the guiding guard members in a position relative to the transverse support means so that the lower face of each guiding guard member is spaced sufficiently closely to a lower run of each crawler track to restrict excessive twisting of the track, and so that the inwardly facing face is spaced sufficiently closely to a vertical portion of the track to restrict excessive transverse movement of the track, the locating means being longitudinally spaced apart from each other along the respective guiding guard member to provide clearance for access to idler bearings of the track; the locating means comprising support portions secured to the transverse support means and guard member portions secured to the guiding guards, the support portions and the guard member portions having locating surfaces which cooperate with each other to prevent relative movement between the guiding guard member and the support means when secured together;

(d) guard securing means for securing the guiding guard member to the end portions of the support means in said position determined by said locating means, the guard securing means on one side of the track being independent of the guard securing means on the opposite side of said track to permit a guiding guard member on one side of the track to be readily installed or removed from the support means independently of a guard member on the other side of the track.

2. An assembly as claimed in claim 1, in which:
(a) the locating surfaces of the guard member portion and the support portions are inclined at complementary angles to each other.

3. An assembly as claimed in claim 1, in which:
(a) the locating surfaces have respective longitudinal axes extending transversely of the crawler tracks.

4. An assembly as claimed in claim 1, in which:
(a) each transverse support means has a lower surface,
(b) each guiding guard member has an upper surface,
(c) the locating surfaces of the locating means cooperate to draw the said upper and lower surfaces into engagement with each other, and to prevent movement between the guiding guard member and the support means when screwed together.

5. An assembly as claimed in claim 1, in which:
(a) each transverse support means has at least one support side surface disposed within a plane generally normal to the crawler track, the locating surface of the support portion being located adjacent the said support side surface,
(b) each guiding guard member has at least one guard member side surface disposed within a plane generally normal to the crawler track, the locating surface of the guard member portion being located adjacent the said guard member side surface,
(c) securing means cooperate with the guiding guard member to cause relative movement between said locating surfaces as the guiding guard member is secured to transverse support means.

6. An assembly as claimed in claim 1, in which:
(a) each transverse support means is generally rectangular in cross-section and has generally horizontal support upper and lower surfaces, and generally vertical support side surfaces, the support side surfaces having respective locating surfaces of the support portion disposed within an inclined plane inclined to a horizontal transverse axis,
(b) each guiding guard member has a respective upper surface and a bracket means secured thereto, the bracket means having two guard member bracket side surfaces spaced apart slightly wider than overall width of the locating surfaces of the support side surfaces to straddle the respective transverse support, the guard member bracket side surfaces having respective locating surfaces of the guard member portions located adjacent thereto.

7. An assembly as claimed in claim 6, in which:
(a) the locating surface of the support portion is an inclined face of a support wedge secured to a respective support side surface,
(b) the locating surface of the guard is an inclined face of a guard member wedge secured to a respective guard member bracket side surface.

8. An assembly as claimed in claim 1, in which:
(a) the transverse support means has an end face with a first securing means of the guard securing means having a securing means axis disposed transversely of the crawler track,
(b) the guiding guard member has a bracket portion having a second securing means of the guard securing means with an axis alignable with the securing means axis,
(c) third securing means of the guard securing means cooperating with the first and second securing means so that as the securing means are tightened, the cooperating surfaces of the locating means cooperate to locate the guiding guard member relative to the crawler track, and to prevent relative movement between the guiding guard member and the transverse supports.

9. An assembly as claimed in claim 8, in which:
(a) the first securing means is a threaded opening in the end face of the transverse support,
(b) the second securing means is a bolt clearance opening in the bracket face,
(c) the third securing means is a threaded bolt passing through the bolt clearance opening and having a threaded end secured in the threaded opening, the bolt having a head adjacent a portion of the bracket remote from the transverse support.

10. An assembly as claimed in claim 5, in which:
(a) each transverse support has an end face with first securing means having a securing means axis disposed transversely of the crawler track,
(b) the guiding guard member has a bracket having second securing means with an axis aligned with the first securing means axis,
(c) third securing means cooperate with the first and second securing means so that as the third securing means are tightened, the locating surface of the guard member portion moves relative to the locating surface of the support portion, and forces the lower surface of the support means into engagement with the upper surface of the guiding guard member to locate the guiding guard member and to prevent relative movement between the guiding guard member and the transverse support.

11. A crawler track vehicle having:
(a) a vehicle body, a front pair of main rollers and rear pair of powered sprockets journalled relative to the body, and righthand and lefthand transversely spaced, parallel, longitudinally extending, crawler tracks, the crawler tracks being endless loops running on a respective main roller and sprocket, and a plurality of idler rollers engaging a lower run of each crawler track to support weight of the vehicle, (b) a plurality of transverse support means, each support means having opposite end portions and being secured to the vehicle body and disposed transversely of each crawler track and spaced longitudinally along each crawler track, (c) at least one guiding guard member secured longitudinally on each side of each crawler track, said at least one guiding guard member having a lower face for restricting twisting movement of the track and an inwardly facing face for restricting excessive transverse movement of the track, (d) locating means for locating the guiding guard members in a position on the transverse support means so that the lower face of each guiding guard member is spaced sufficiently closely to a lower run of each crawler track to restrict excessive twisting of the track, and so that the inwardly facing face is spaced sufficiently closely to a vertical portion of the track to restrict excessive transverse movement of the track, the locating means being longitudinally spaced apart from each other along the respective guiding guard member to provide clearance for access to idler bearings of the track; the locating means comprising support portions secured to the transverse support means and guard member portions secured to the guiding guards, the support portions and the guard member portions having locating surfaces which cooperate with each other to prevent relative movement between the guiding guard member and the support means when secured together;

(e) guard securing means for securing the guiding guard member to the end portions of the support means in said position determined by said locating means, the guard securing means on one side of the track being independent of the guard securing means on the opposite side of the track to permit the guiding guard member to be readily installed or removed from the support means.

12. A vehicle as claimed In claim 11, in which:
(a) the locating surfaces of the guard member portions and the support portions are inclined at complementary angles to each other.

13. A vehicle as claimed in claim 11, in which:
(a) the complementary surfaces have respective longitudinal axes extending transversely of the crawler tracks.

14. A vehicle as claimed in claim 11, in which:
(a) each transverse support means has a lower surface,
(b) each guiding guard member has an upper surface,
(c) locating surfaces of the locating means cooperate to urge the upper and lower surfaces into engagement with each other.

15. A vehicle as claimed in claim 11, in which:
(a) each transverse support means has at least one support side surface disposed within a plane generally normal to the crawler track, the locating surface of the support portion being located adjacent the said support side surface,
(b) each guiding guard member has at least one guard member side surface disposed within a plane generally normal to the crawler track, the locating surface of the guide portion being located adjacent the said guard member surface,
(c) securing means cooperate with the guiding guard member to force the locating surfaces of the guiding guard member into intimate contact with the locating surfaces of the support portion to provide a secure connection therebetween.

16. A vehicle as claimed in claim 11, in which:
(a) each transverse support means is generally rectangular in cross-section and has generally horizontal support upper and lower surfaces, and generally vertical support side surfaces, the support side surfaces having respective locating surfaces of the support portion disposed within an inclined plane inclined to a horizontal transverse axis,
(b) each guiding guard member has a respective upper surface and a bracket means secured thereto, the bracket means having two guard member bracket side surfaces spaced apart slightly wider than overall width of the locating surfaces of the support side surfaces to straddle the respective transverse support, the guard member bracket side surfaces having respective locating surfaces of the guard portions located adjacent thereto.

17. A vehicle as claimed in claim 16, in which:
(a) the locating surface of the support portion is an inclined face of a support wedge secured to a respective support side surface,
(b) the locating surface of the guard portion is an inclined face of a guard wedge secured to a respective guard bracket side surface.

18. A vehicle as claimed in claim 1, in which:
(a) the transverse support means has an end face with first securing means of the guard securing means having a securing means axis disposed transversely of the crawler track,
(b) the guiding guard member has a bracket portion having a second securing means of the guard securing means with an axis alignable with the securing means axis,
(c) third securing means of the guard securing means cooperating with the first and second securing means so that as the securing means are tightened, the cooperating surfaces of the locating means cooperate to locate the guiding guard member relative to the crawler track, and to prevent relative movement between the guiding guard member and the transverse supports.

19. A vehicle as claimed in claim 18, in which:
(a) the first securing means is a threaded opening in the end face of the transverse support,
(b) the second securing means is a bolt clearance opening in the bracket face,
(c) the third securing means is a threaded bolt passing through the bolt clearance opening and having a threaded end secured in the threaded opening, the bolt having a head adjacent a portion of the bracket remote from the transverse support.

20. A vehicle as claimed in claim 15, in which:
(a) each transverse support has an end face with first securing means having a securing means axis disposed transversely of the crawler track,
(b) the guiding guard member has a bracket having second securing means with an axis aligned with the first securing means axis,
(c) third securing means cooperate with the first and second securing means so that as the third securing means are tightened, the locating surface of the guard portion moves relative to the locating surface of the support portion, and forces the lower surface of the support means into engagement with the upper surface of the guiding guard member to locate the guiding guard member and to prevent relative movement between the guiding guard member and the transverse support.

21. A guiding guard member assembly for a crawler track vehicle comprising:
    (a) a plurality of transverse support means, the support means being securable to the vehicle to be disposed transversely of each crawler track, and to be spaced longitudinally along each crawler track,
    (b) at least one guiding guard member securable longitudinally on each side of each crawler track,
    (c) locating means for locating the guiding guard members relative to the transverse support means so that a lower face of each guiding guard member is spaced sufficiently closely to a lower run of each crawler track to resist excessive twisting of the track, the locating means comprising support portions secured to the transverse support means and guard member portions secured to the guiding guards, the support portions and the guard member portions having locating surfaces which cooperate with each other to prevent relative movement between the guiding guard member and the support means when secured together;
    (d) at least one support side surface on each transverse support means, said at least one support side surface being disposed within a plane generally normal to the crawler track, the locating surface of the support portion being located adjacent the said support side surface,
    (e) at least one guard member side surface on each guiding guard member, said at least one guard member side surface being disposed within a plane generally normal to the crawler track, the locating surface of the guard member portion being located adjacent the said guard member side surface,
    (f) securing means cooperating with the guiding guard member to cause relative movement between said locating surfaces as the guiding guard member is secured to the transverse support means.

22. An assembly as claimed in claim 21, in which:
    (a) each transverse support means is generally rectangular in cross-section and has generally horizontal support upper and lower surfaces, and generally vertical support side surfaces, the support side surfaces having respective locating surfaces of the support portion disposed within an inclined plane inclined to a horizontal transverse axis,
    (b) each guiding guard member has a respective upper surface and a bracket means secured thereto, the bracket means having two guard member bracket side surfaces spaced apart slightly wider than overall width of the locating surfaces of the support side surfaces to straddle the respective transverse support, the guard member bracket side surfaces having respective locating surfaces of the guard member portions located adjacent thereto.

23. An assembly as claimed in claim 22, in which:
    (a) the locating surface of the support portion is an inclined face of a support wedge secured to a respective support side surface,
    (b) the locating surface of the guard member portion is an inclined face of a guard member wedge secured to a respective guard member bracket side surface.

24. A guiding guard member assembly for a crawler track vehicle comprising:
    (a) a plurality of transverse support means, the support means being securable to the vehicle to be disposed transversely of each crawler track, and to be spaced longitudinally along each crawler track,
    (b) at least one guiding guard member securable longitudinally on each side of each crawler track,
    (c) locating means for locating the guiding guard members relative to the transverse support means so that a lower face of each guiding guard member is spaced sufficiently closely to a lower run of each crawler track to resist excessive twisting of the track, the locating means comprising support portions secured to the transverse support means and guard member portions secured to the guiding guards, the support portions and the guard member portions having locating surfaces which cooperate with each other to prevent relative movement between the guiding guard member and the support means when secured together;
    (d) end faces on the transverse support means, each end face having first securing means having a securing means axis disposed transversely of the crawler track,
    (e) a bracket portion on the said at least one guiding guard member, the bracket portion having a second securing means with an axis alignable with the securing means axis,
    (f) third securing means cooperating with the first and second securing means so that as the securing means are tightened, the cooperating surfaces of the locating means cooperate to locate the guiding guard member relative to the crawler track, and to prevent relative movement between the guiding guard member and the transverse supports.

25. An assembly as claimed in claim 24, in which:
    (a) the first securing means is a threaded opening in the end face of the transverse support,
    (b) the second securing means is a bolt clearance opening in the bracket face,
    (c) the third securing means is a threaded bolt passing through the bolt clearance opening and having a threaded end secured in the threaded opening, the bolt having a head adjacent a portion of the bracket remote from the transverse support.

26. An assembly as claimed in claim 21, in which:
    (a) each transverse support has an end face with first securing means having a securing means axis disposed transversely of the crawler track,
    (b) the guiding guard member has a bracket having second securing means with an axis aligned with the first securing means axis,
    (c) third securing means cooperate with the first and second securing means so that as the third securing means are tightened, the locating surface of the guard member portion moves relative to the locating surface of the support portion, and forces the lower surface of the support means into engagement with the upper surface of the guiding guard member to locate the guiding guard member and to prevent relative movement between the guiding guard member and the transverse support.

27. A crawler track vehicle having:
    (a) a vehicle body, a front pair of main rollers and rear pair of powered sprockets journalled relative to the body, and right hand and left hand transversely spaced, parallel, longitudinally extending, crawler tracks, the crawler tracks being endless loops running on a respective main roller and sprocket, and a plurality of idler rollers engaging a lower run of each crawler track to support weight of the vehicle, (b) a plurality of transverse support means, the support means being secured to the vehicle body and disposed transversely of each crawler track and spaced longitudinally along each crawler track, (c) at least one guiding guard member secured longitudinally on each side of each crawler track, (d) locating means for locating the guiding guard members on the transverse support means so that a lower face of each guiding guard member is spaced sufficiently closely to a lower run of each crawler track to resist excessive twisting of the track, the locating means comprising support portions secured to the transverse support means and guard member portions secured to the guiding guard members, the support portions and the guard member portions having locating surfaces which cooperate with each other to prevent relative movement between the guiding guard member and the support means when secured together, (e) at least one support side surface on each transverse support means, said at least one support side surface being disposed within a plane generally normal to the crawler track, the locating surface of the support portion being located adjacent the said support side surface, (f) at least one guard member side surface on each guiding guard member, said at least one guard member side surface being disposed within a plane generally normal to the crawler track, the locating surface of the guard portion being located adjacent the said guard member surface, and (g) securing means cooperating with the guiding guard member to force the locating surfaces of the guiding guard member into intimate contact with the locating surfaces of the support portion to provide a secure connection therebetween.

28. A vehicle as claimed in claim 27, in which:
(a) each transverse support means is generally rectangular in cross-section and has generally horizontal support upper and lower surfaces, and generally vertical support side surfaces, the support side surfaces having respective locating surfaces of the support portion disposed within an inclined plane inclined to a horizontal transverse axis,
(b) each guiding guard member has a respective upper surface and a bracket means secured thereto, the bracket means having two guard member bracket side surfaces spaced apart slightly wider than overall width of the locating surfaces of the support side surfaces to straddle the respective transverse support, the guard member bracket side surfaces having respective locating surfaces of the guard portions located adjacent thereto.

29. A vehicle as claimed in claim 28, in which:
(a) the locating surface of the support portion is an inclined face of a support wedge secured to a respective support side surface,
(b) the locating surface of the guard portion is an inclined face of a guard wedge secured to a respective guard bracket side surface.

30. A vehicle as claimed in claim 27, in which:
(a) each transverse support has an end face with first securing means having a securing means axis disposed transversely of the crawler track,
(b) the guiding guard member has a bracket having second securing means with an axis aligned with the first securing means axis,
(c) third securing means cooperate with the first and second securing means so that as the third securing means are tightened, the locating surface of the guard portion moves relative to the locating surface of the support portion, and forces the lower surface of the support means into engagement with the upper surface of the guiding guard member to locate the guiding guard member and to prevent relative movement between the guiding guard member and the transverse support.

31. A crawler track vehicle having:
(a) a vehicle body, a front pair of main rollers and a rear pair of powered sprockets journalled relative to the body, and right hand and left hand transversely spaced, parallel, longitudinally extending, crawler tracks, the crawler tracks being endless loops running on a respective main roller and sprocket, and a plurality of idler rollers engaging a lower run of each crawler track to support weight of the vehicle,
(b) a plurality of transverse support means, the support means being secured to the vehicle body and disposed transversely of each crawler track and spaced longitudinally along each crawler track,
(c) at least one guiding guard member secured longitudinally on each side of each crawler track,
(d) locating means for locating the guiding guard members on the transverse support means so that a lower face of each guiding guard member is spaced sufficiently closely to a lower run of each crawler track to resist excessive twisting of the track, the locating means comprising support portions secured to the transverse support means and guard member portions secured to the guiding guard members, the support portions and the guard member portions having locating surfaces which cooperate with each other to prevent relative movement between the guiding guard member and the support means when secured together,
(e) an end face on the transverse support means, the end face having first securing means having a securing means axis disposed transversely of the crawler track,
(f) a bracket portion on the guiding guard member, the bracket portion having a second securing means with an axis alignable with the securing means axis,
(g) third securing means cooperating with the first and second securing means so that as the securing means are tightened, the cooperating surfaces of the locating means cooperate to locate the guiding guard member relative to the crawler track, and to prevent relative movement between the guiding guard member and the transverse supports.

32. A vehicle as claimed in claim 31, in which:
(a) the first securing means is a threaded opening in the end face of the transverse support,
(b) the second securing means is a bolt clearance opening in the bracket face,
(c) the third securing means is a threaded bolt passing through the bolt clearance opening and having a threaded end secured in the threaded opening, the bolt having a head adjacent a portion of the bracket remote from the transverse support.

* * * * *